(12) United States Patent
Kimata (10) Patent No.: US 7,482,975 B2
(45) Date of Patent: Jan. 27, 2009

(54) MULTI-BEAM TRANSMITTING/RECEIVING APPARATUS AND TRANSMITTING/RECEIVING METHOD

(75) Inventor: Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 88 days.

(21) Appl. No.: 10/581,510

(22) PCT Filed: Nov. 8, 2004

(86) PCT No.: PCT/JP2004/016513

§ 371 (c)(1),
(2), (4) Date: Jun. 1, 2006

(87) PCT Pub. No.: WO2005/055466

PCT Pub. Date: Jun. 16, 2005

(65) Prior Publication Data

US 2007/0109183 A1    May 17, 2007

(30) Foreign Application Priority Data

Dec. 1, 2003   (JP) .............................. 2003-401628

(51) Int. Cl.
*H01Q 1/00* (2006.01)
*H01Q 3/00* (2006.01)
(52) U.S. Cl. ...................... 342/370; 342/377; 342/422; 342/423
(58) Field of Classification Search ................. 342/377, 342/383, 370, 422–423; 455/562; 375/148
See application file for complete search history.

(56) References Cited

U.S. PATENT DOCUMENTS 7,215,699 B2 * 5/2007 Yoshida ...................... 375/147

2001/0020917 A1 * 9/2001 Hamada et al. ............. 342/442
2003/0114193 A1 * 6/2003 Kavak et al. ................ 455/562

FOREIGN PATENT DOCUMENTS

| JP | 11-266228   | 9/1999 |
| JP | 2000-151488 | 5/2000 |
| JP | 2001-203623 | 7/2001 |
| JP | 2001-251233 | 9/2001 |

(Continued)

*Primary Examiner*—Thomas H Tarcza
*Assistant Examiner*—Nga X Nguyen
(74) *Attorney, Agent, or Firm*—Scully, Scott, Murphy & Presser PC (57) ABSTRACT

A multibeam transmitting/receiving apparatus is provided that is capable of increasing the accuracy of a direction in which a transmission beam is to be transmitted, with a simple arrangement. Signal power measuring units (8-1 through 8-L) of signal processing means (40-1 through 40-L) measure reception signal power levels averaged over a given time, using outputs from reception beam formers (5-1 through 5-L), and indicate the measured reception signal power levels to transmission antenna weight generator (30). Transmission antenna weight generator (30) generates transmission antenna weights, which has been weighted by a reception signal level, from a transmission antenna weight corresponding to reception signal power level $P_1$ and a beam number $B_1$ of a finger having a maximum reception signal power level, and a transmission antenna weight corresponding to reception signal power level $P_2$ and a beam number $B_2$ of a finger having the same path timing as the finger having the maximum reception signal power level. The generated transmission antenna weights are used in transmission beam former (16).

2 Claims, 9 Drawing Sheets

FOREIGN PATENT DOCUMENTS

| | | |
|---|---|---|
| JP | 2002-135032 | 5/2002 |
| JP | 2002-232326 | 8/2002 |
| JP | 2003-8483 | 1/2003 |
| JP | 2003-110476 | 4/2003 |
| JP | 2003-218772 | 7/2003 |
| JP | 2003-283394 | 10/2003 |

* cited by examiner

Fig. 1

PRIOR ART

PRIOR ART

MULTI-BEAM TRANSMITTING/RECEIVING APPARATUS AND TRANSMITTING/RECEIVING METHOD

TECHNICAL FIELD

The present invention relates to a multibeam transmitting/receiving apparatus and method, and more particularly to a multibeam transmitting/receiving apparatus and transmitting/receiving method for receiving uplink signals with a plurality of antennas and controlling the directivities of downlink transmission signals transmitted from the antennas based on the received signals.

BACKGROUND ART

CDMA (Code Division Multiple Access) has attracted much attention as a wireless transmission process capable of greatly increasing the subscriber capacity and is expected as a wireless access process for the next-generation mobile communication cellular system. However, CDMA has a problem in that a base station receiver tends to suffer interference from another user's signal which is making simultaneous access with the same carrier, and a mobile station receiver is liable to cause interference due to a signal set to another user. One approach to remove such interference is the use of an array antenna. An array antenna has a plurality of antennas for receiving signals and combining complex-weighted values thereof to control the amplitudes and phases of the received signals for thereby forming a directivity beam to receive a desired user's signal and suppress other user's interference signals. A multi-beam process as one of control processes for such an array antenna is known from Document 1 shown below.

Document: JP 11-266228A

Figure 1:
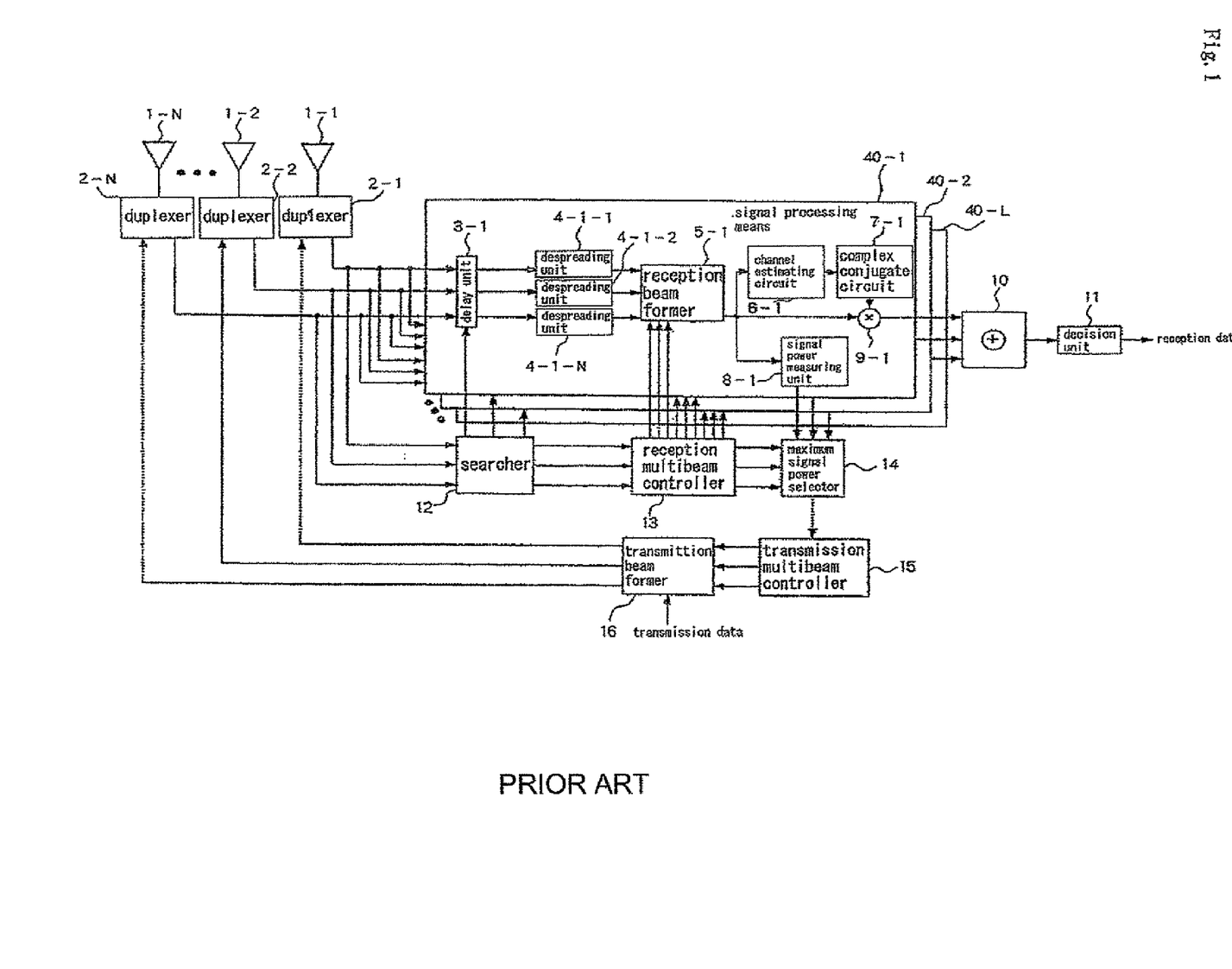
FIG. 1 is a diagram showing by way of example a conventional multi-beam transmitting/receiving apparatus.

FIG. 1 is a diagram showing by way of example a conventional multi-beam transmitting/receiving apparatus disclosed in Document 1. It is assumed that the number of antennas is N, N being an integer of 2 or greater, the number of multipaths is L, L being an integer of 1 or greater, and the multi-beam transmitting/receiving apparatus is assigned to a kth user, k being an integer of 1 or greater).

As shown in FIG. 1, the conventional multi-beam transmitting/receiving apparatus, which is assigned to the kth user, comprises N antennas 1-1 through 1-N, duplexers 2-1 through 2-N, L signal processing means 40-1 through 40-L corresponding to L multipaths, adder 10, decision unit 11, searcher 12, reception multibeam controller 13, maximum signal power selector 14, transmission multibeam controller 15, and transmission beam former 16.

L signal processing means 40-1 through 40-L corresponding to L multipaths are identical in construction to each other. L signal processing means 40-1 through 40-L comprise delay units 3-1 through 3-L, despreading circuits 4-1-1 through 4-L-N, reception beam formers 5-1 through 5-L, channel estimating circuits 6-1 through 6-L, complex conjugate circuits 7-1 through 7-L, signal power measuring units 8-1 through 8-L, and multipliers 9-1 through 9-L.

Searcher 12 generates delay profiles for respective preset beams, using reception signals received through N antennas 1-1 through 1-N and duplexers 2-1 through 2-N. Searcher 12 detects delay times (path timing) of L multipaths from the generated delay profiles for respective preset beams, indicates the timing of the detected delay times of L multipaths to delay units 3-1 through 3-L, and indicates the beam numbers of beams, with respect to which the delay times of multipaths are detected, to reception multibeam controller 13.

A beam refers to a directivity pattern formed by assigning a preset antenna weight to each of antennas 1-1 through 1-N, and a beam number refers to a number for specifying one of the preset beams.

Delay units 3-1 through 3-N delay reception signals received by N antennas 1-1 through 1-N by certain times based on multipath delay times set by searcher 12, thereby delaying the reception signals depending on the L multipaths to differentiate the L multipaths as a first path to an Lth path. The reception signals output from delay units 3-1 through 3-N are despread by despreading circuits 4-1-1 through 4-L-N, and thereafter sent to reception beam formers 5-1 through 5-L.

Reception multibeam controller 13 selects the reception antenna weights of beams corresponding to the beam numbers indicated by searcher 12, sends the selected reception antenna weights to reception beam formers 5-1 through 5-L, and indicates the beam numbers to maximum signal power selector 14.

Reception beam formers 5-1 through 5-L weights and combines the signals which have been delayed by delay units 3-1 through 3-N and despread by despreading circuits 4-1-1 through 4-L-N, using the reception antenna weights indicated by reception multibeam controller 13.

The above operation of searcher 12 to indicate the timing of the delay times of the multipaths to delay units 3-1 through 3-L of signal processing means 40-1 through 40-L and also to indicate the beam numbers to reception multibeam controller 13 to enable them to start signal processing, is referred to as the assignment of fingers. A path detecting method disclosed in Document 2 entitled "Path detecting method, path detecting apparatus, and array antenna reception apparatus" may be used as a path detecting process performed by searcher 12.

Document 2: JP-2002-232326A

Figure 2:
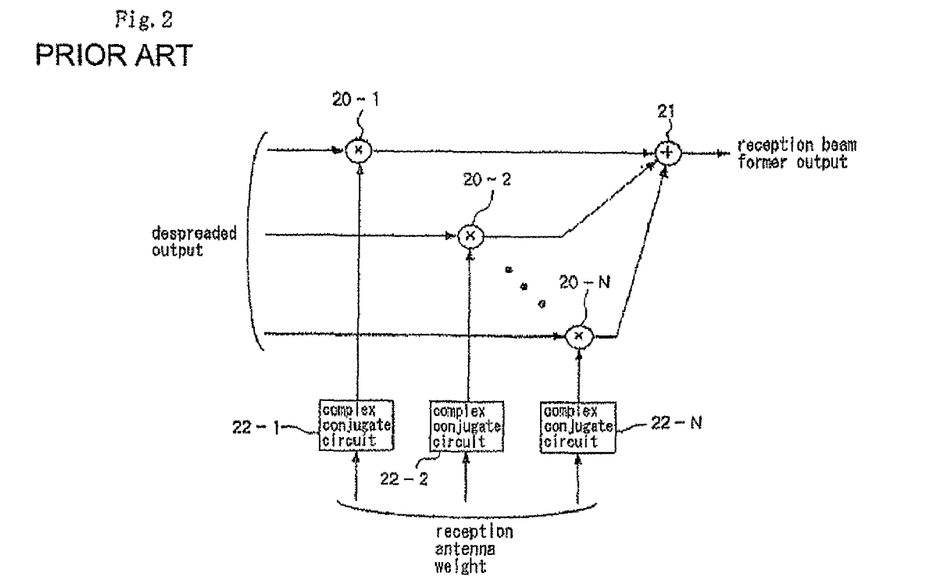
FIG. 2 is a block diagram of an arrangement of reception beam former 5-1 shown in FIG. 1.

FIG. 2 is a block diagram of each of reception beam formers 5-1 through 5-L. Reception beam formers 5-1 through 5-L are identical in construction to each other, and each comprise multipliers 20-1 through 20-N, adder 21, and complex conjugate circuits 22-1 through 22-N. For the sake of brevity, signal processing means 40-1 will be described by way of example below.

Complex conjugate circuits 22-1 through 22-N of reception beam former 5-1 generate complex conjugates of reception antenna weights selected by reception multibeam controller 13 and sends the generated complex conjugates to multipliers 20-1 through 20-N. Reception signals that have been despread by despreading circuits 4-1-1 through 4-1-N are multiplied by the complex conjugates of reception antenna weights which have been generated by complex conjugate circuits 22-1 through 22-N, by multipliers 20-1 through 20-N. The multiplied reception signals are then added together by adder 21. Therefore, the reception signals are weighted and combined. The output from adder 21 is sent to channel estimating circuit 6-1, signal power measuring unit 8-1, and multiplier 9-1. Thus, reception beam former 5-1 controls the amplitudes and phases of reception signals from antennas 1-1 through 1-N to receive a reception signal with the directivity of a beam that has been formed in a certain direction.

Channel estimating circuit 6-1 estimates a channel distortion using the output from reception beam former 5-1, and sends the estimated channel distortion to complex conjugate circuit 7-1. Complex conjugate circuit 7-1 generates a complex conjugate of the channel distortion estimated by channel estimating circuit 6-1. Multiplier 9-1 multiplies the complex conjugate of the channel distortion which has been generated by complex conjugate circuit 7-1, by the output from reception beam former 5-1, thereby compensating for the channel distortion. The output from multiplier 9-1, which has been compensated for the channel distortion, is added by adder 10 for rake combination, and input to decision unit 11. Decision unit 11 outputs its output as the reception data of the kth user.

Signal power measuring units 8-1 through 8-L measure signal power levels averaged over a desired time, using the signals weighted and combined by reception beam formers 5-1 through 5-L, and sends the measured signal power levels to maximum signal power selector 14. Maximum signal power selector 14 selects the beam of a finger with respect to which the maximum signal power level has been obtained, using the signal power levels measured by signal power measuring units 8-1 through 8-L and the beam numbers indicated by reception multibeam controller 13, and indicates the selected beam to transmission multibeam controller 15. Transmission multibeam controller 15 selects the transmission antenna weight of a corresponding beam from the beam number of the finger having the maximum signal power level indicated from maximum signal power selector 14, and sends the selected transmission antenna weight to transmission beam former 16.

Transmission beam former 16 weights and combines transmission signals, using transmission antenna weights generated by transmission multibeam controller 15.

Figure 3:
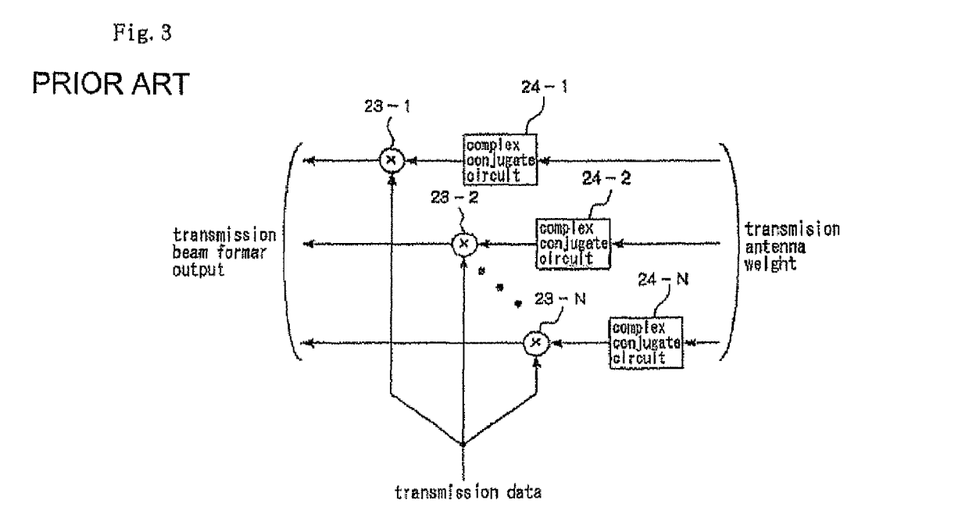
FIG. 3 is a block diagram of an arrangement of transmission beam former 16 shown in FIG. 1.

FIG. 3 is a block diagram of transmission beam former 16. Transmission beam former 16 comprises multipliers 23-1 through 23-N and complex conjugate circuits 24-1 through 24-N. Complex conjugate circuits 24-1 through 24-N of transmission beam former 16 generate complex conjugates of transmission antenna weights selected by transmission multibeam controller 15 and sends the generated complex conjugates to multipliers 23-1 through 23-N. The transmission data of the kth user is multiplied by the complex conjugates of transmission antenna weights which have been generated by complex conjugate circuits 24-1 through 24-N, by multipliers 23-1 through 23-N. The multiplied transmission data is then transmitted through duplexers 2-1 through 2-N from antennas 1-1 through 1-N.

Figure 4:
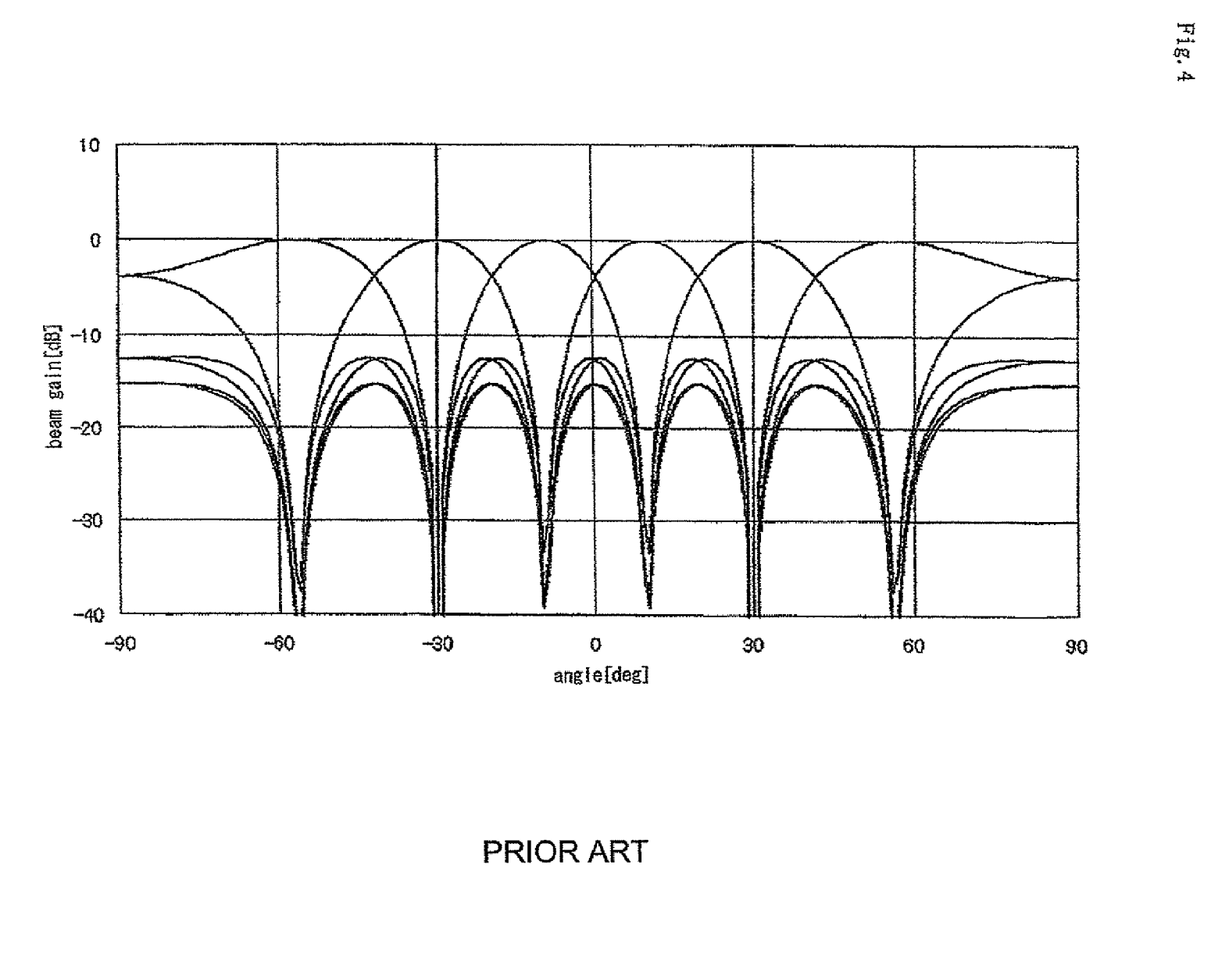
FIG. 4 is a diagram showing by way of example an orthogonal multibeam pattern.
Figure 5:
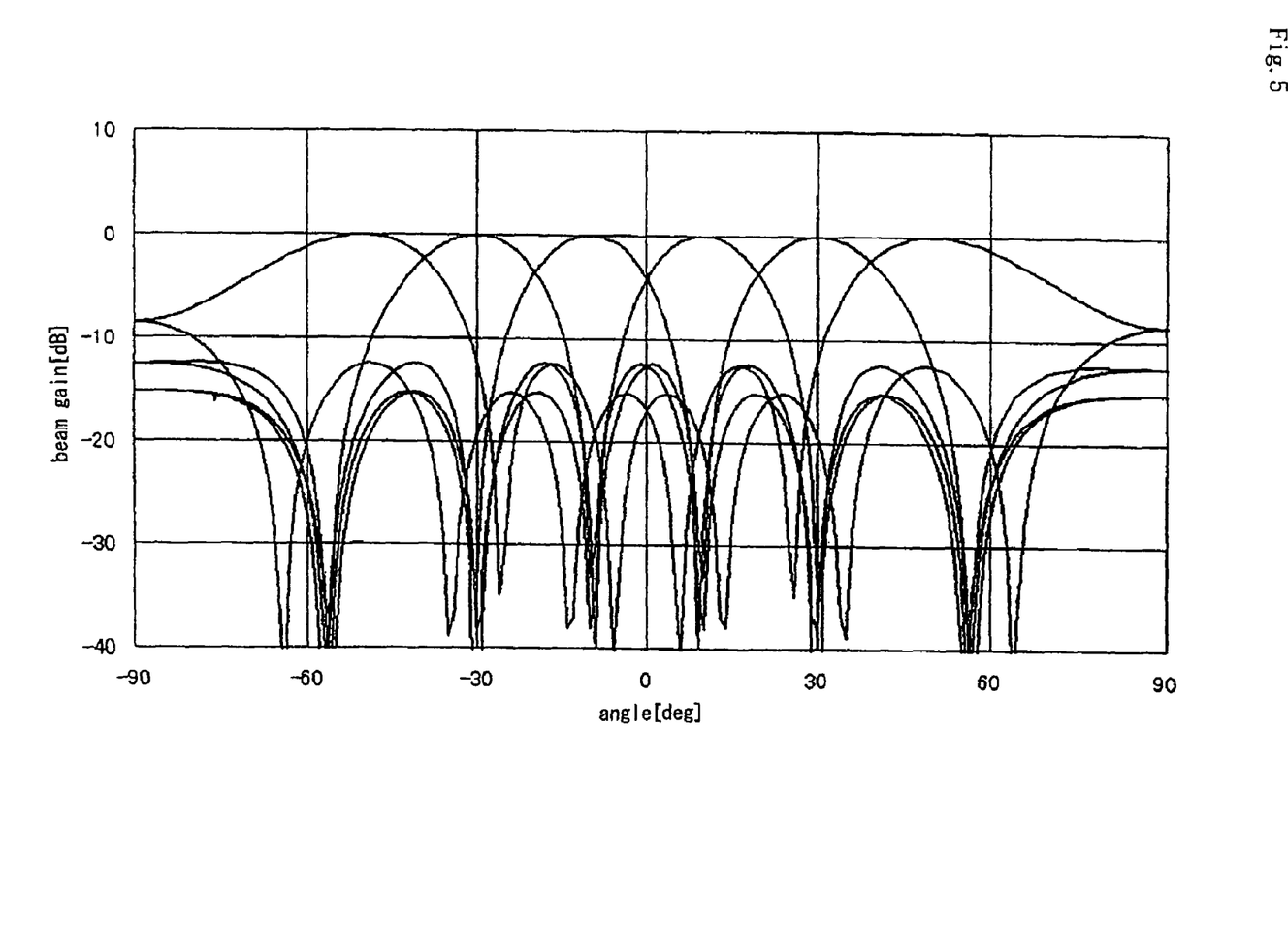
FIG. 5 is a diagram showing by way of example an equally spaced multibeam pattern.

Generally, the beams of a multibeam pattern are disposed so as to cover a given spatial area (e.g., a sector) as uniformly as possible. There are two ways of disposing the beams. According to one way, as shown in FIG. 4, the beams are disposed using an orthogonal multibeam pattern such that the peak direction of a beam is aligned with the null direction of another beam. According to the other scheme, as shown in FIG. 5, the beams are disposed using an equally spaced multibeam pattern such that a plurality of beams are arranged at equally spaced intervals. In FIGS. 4 and 5, the number of antennas is 6 and the number of beams is 6, with the horizontal axis representing angles in the given spatial area and the vertical axis beam gains. In the vicinity of a point of intersection between two adjacent beams, their beam gains are several dB lower than the peaks of the beams. Therefore, a desired signal coming from the direction of the point of intersection may be received with the two beams adjacent to the point of intersection, and the beam outputs may be combined with each other to compensate for a reception power level.

However, the conventional multi-beam transmitting/receiving apparatus suffers the following problems: Even if the beam of a finger having the maximum signal power level is selected using the signal power levels measured by signal power measuring units 8-1 through 8-L and the beam numbers indicated by reception multibeam controller 13, and a downlink transmission is performed using the selected beam, the transmission is not optimized. The reasons for the problem are as follows: If the user who is to transmit data is positioned near a point of intersection between two adjacent beams, then when one of the beams is selected and the data is transmitted with the selected beam, since the user is present in a position displaced off the peak direction of the beam, the direction of the beam for transmitting the data is not optimum, and the transmission tends to given interference to another user who is present in the peak direction of the beam. One solution to the above problem is to increase the number of beams of the multibeam pattern for increasing the resolution in the transmission direction. However, the solution is not practical as the amount of calculations required for searcher 12 to generate delay profiles is increased.

DISCLOSURE OF THE INVENTION

It is an object of the present invention to provide a multibeam transmitting/receiving apparatus and transmitting/receiving method which are capable of increasing the accuracy of the direction in which to transmit a transmission beam with a simple arrangement, even if a user who is to transmit data is positioned near a point of intersection between two adjacent beams.

To achieve the above object, there is provided in accordance with the present invention a multibeam transmitting/receiving apparatus for receiving uplink reception signals with a plurality of antennas and controlling the directivities of downlink transmission signals transmitted from the antennas based on the reception signals, wherein delay profiles for respective preset beams are generated, and if the same path timing as the path timing with respect to which a maximum reception power level has been detected is detected from different delay profiles, then it is judged that a mobile station to which data is to be transmitted is present in a position displaced off the peak direction of any beams, and the directivities of a downlink transmission signal are controlled based on reception antenna weights with respect to two beams from which the path timing has been detected and reception power levels obtained using two path timings.

According to the present invention, there is provided another multibeam transmitting/receiving apparatus for receiving uplink reception signals with a plurality of antennas and controlling the directivity of downlink transmission signals transmitted from the antennas based on the reception signals, the apparatus comprising:

a searcher for generating delay profiles for respective preset beams using the reception signals, detecting the path timing of a plurality of multipaths from the generated delay profiles for the respective beams, and outputting the detected path timing and a beam number with respect to which the path timing is detected;

a plurality of signal processing means each comprising a reception multibeam controller for outputting reception antenna weights corresponding to the beam number indicated from the searcher, a delay unit for delaying the reception signals by a given time based on the path timing set by the searcher, a reception beam former for weighting and combining the reception signals delayed by the delay unit using the reception antenna weight indicated from the reception multibeam controller, and a signal power measuring unit for measuring reception signal power level of the signal weighted and combined by the reception beam former;

a transmission antenna weight generator for detecting a maximum reception signal power level from the reception signal power levels indicated from the respective signal power measuring units of the signal processing means, determining whether the same path timing as the path timing set in first signal processing means in which the maximum reception signal power level is obtained is present in the path timing set in another signal processing means or not, and, if the same path timing as the path timing set in the first signal processing means is set in the other signal processing means, generating a transmission antenna weight based on the reception power level of the first signal processing means, the reception power level of second signal processing means in which the same path timing as the path timing set in the first signal processing means is set, and reception antenna weights set in the first and second signal processing means; and a transmission beam former for weighting and combining the transmission signals using the transmission antenna weights generated by the transmission antenna weight generator.

According to the present invention, the searcher generates delay profiles for respective preset beams, and the signal processing means are associated with respective path timings to assign fingers. If the same path timing as the path timing with respect to which a maximum reception power level has been detected is detected from different delay profiles, then it is judged that a mobile station to which data is to be transmitted is present in a position displaced off the peak direction of any beams, and the directivities of a downlink transmission signals are controlled based on reception antenna weights with respect to two beams from which the path timing has been detected and reception power levels obtained using two path timings.

According to the present invention, therefore, a transmission beam is not formed in the same directivity pattern as a reception beam prepared in advance, but a transmission beam which is higher in accuracy than a reception beam is formed, so that a transmission antenna weight for transmitting data in the direction of a mobile station of a party to communicate with as a desired user can be generated with utmost ease. Therefore, data can be optimally transmitted to the desired user irrespective of the position where the user is present, and interference with other users which occurs if the peak direction of the beam is not optimum is reduced.

According to the present invention, there is provided still another a multibeam transmitting/receiving apparatus for receiving uplink reception signals with a plurality of antennas and controlling the directivities of downlink transmission signals transmitted from the antennas based on the reception signals, the apparatus comprising:

a searcher for generating delay profiles for respective preset beams using the reception signals, detecting the path timings of a plurality of multipaths from the generated delay profiles for the respective beams, and outputting the detected path timings, beam numbers with respect to which the path timing is detected, and reception power levels of respective fingers which are obtained when respective path timings are detected;

a plurality of signal processing means each comprising a reception multibeam controller for outputting reception antenna weights corresponding to the beam numbers indicated from the searcher, a delay unit for delaying the reception signals by a given time based on the path timing set by the searcher, and a reception beam former for weighting and combining the reception signals delayed by the delay unit using the reception antenna weights indicated from the reception multibeam controller;

a transmission antenna weight generator for detecting a maximum reception signal power level from the reception signal power levels for respective fingers indicated from the searcher, selecting a first finger in which the maximum reception signal power level is obtained, determining whether the same path timing as the path timing set in the first finger is present in the path timing set in another finger or not, and if the same path timing as the path timing set in the first finger is set in the other finger, generating a transmission antenna weight based on the reception power level of the first finger, the reception power level of a second finger in which the same path timing as the path timing set in the first finger is set, and reception antenna weights set in the first and second fingers; and a transmission beam former for weighting and combining the transmission signals using the transmission antenna weights generated by the transmission antenna weight generator.

According to the present invention, since reception power levels of respective fingers which are obtained when path timings are detected are indicated from the searcher to the transmission antenna weight generator, it is possible to dispense with signal power measuring units for measuring reception power levels of signals that have been weighted and combined by the signal processing means.

The transmission antenna weight generator may generate transmission antenna weights using the angle of direction of a preset beam corresponding to the beam number.

BEST MODE FOR CARRYING OUT THE INVENTION

Embodiments of the present invention will be described in detail below with reference to the drawings.

1st EMBODIMENT

Figure 6:
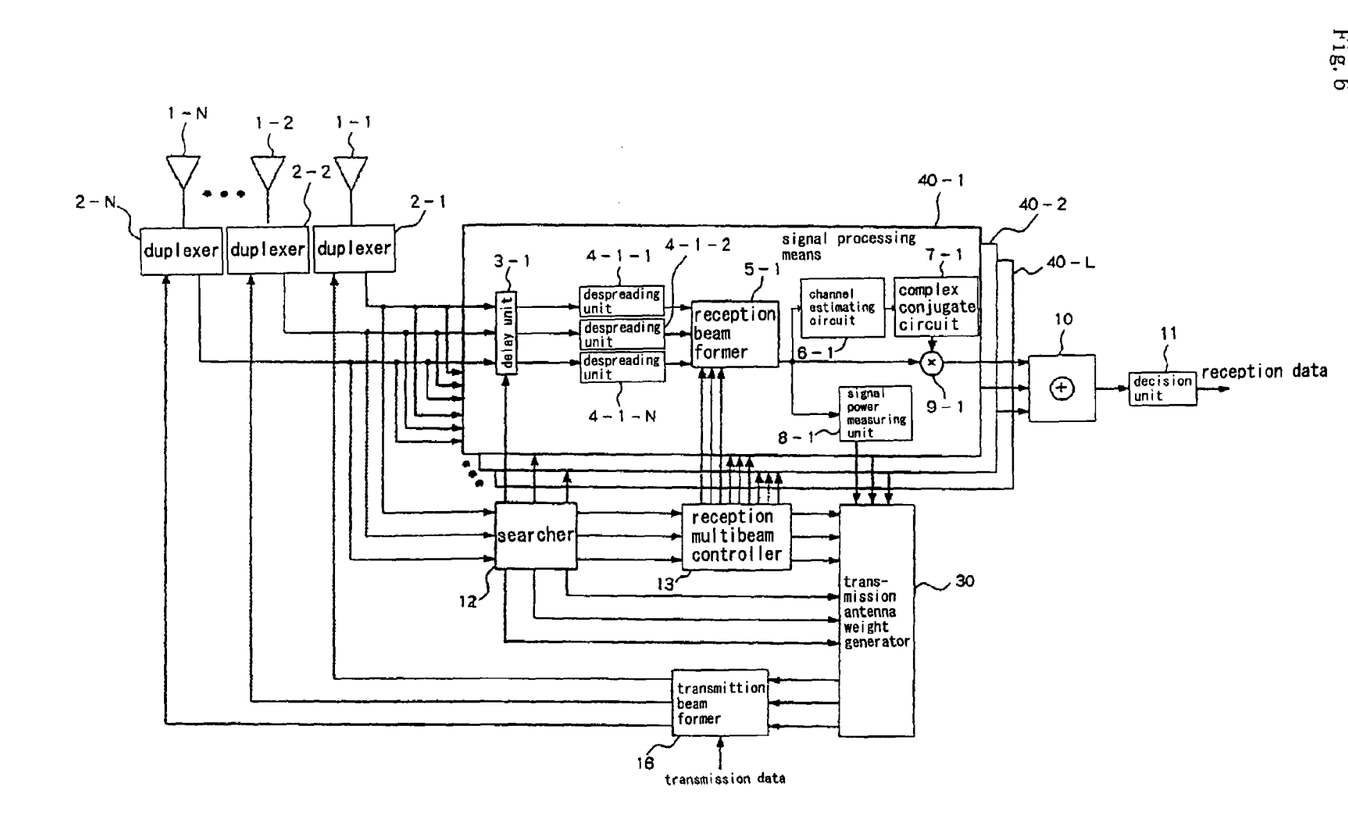
FIG. 6 is a block diagram of an arrangement of a multi-beam transmitting/receiving apparatus according to a first embodiment of the present invention.

A first embodiment of the present invention will first be described in detail below with reference to the drawings. FIG. 6 is a diagram showing an arrangement of a multi-beam transmitting/receiving apparatus according to the first embodiment of the present invention. Those parts of the multi-beam transmitting/receiving apparatus which are identical to those shown in FIG. 1 are denoted by identical reference characters. It is assumed in FIG. 6 that the number of antennas is N, N being an integer of 2 or greater, the number of multipaths is L, L being an integer of 1 or greater, and the multi-beam transmitting/receiving apparatus is assigned to a kth user, k being an integer of 1 or greater.

As shown in FIG. 6, the multi-beam transmitting/receiving apparatus according to the present embodiment, which is assigned to the kth user, comprises N antennas 1-1 through 1-N, duplexers 2-1 through 2-N, L signal processing means 40-1 through 40-L corresponding to multipaths with the number of paths being L, adder 10, decision unit 11, searcher 12, reception multibeam controller 13, transmission antenna weight generator 30, and transmission beam former 16.

The multi-beam transmitting/receiving apparatus according to the present embodiment differs from the conventional multi-beam transmitting/receiving apparatus shown in FIG. 1 in that it has transmission antenna weight generator 30 replacing maximum signal power selector 14 and transmission multibeam controller 15.

L signal processing means 40-1 through 40-L corresponding to the respective multipaths are identical in construction to each other. L signal processing means 40-1 through 40-L comprise delay units 3-1 through 3-L, despreading circuits 4-1-1 through 4-L-N, reception beam formers 5-1 through 5-L, channel estimating circuits 6-1 through 6-L, complex conjugate circuits 7-1 through 7-L, signal power measuring units 8-1 through 8-L, and multipliers 9-1 through 9-L. Searcher 12 generates delay profiles for respective preset beams, using reception signals received through N antennas 1-1 through 1-N and duplexers 2-1 through 2-N. Searcher 12 detects delay times (path timing) of L multipaths from the generated delay profiles for respective preset beams, indicates the detected timing to delay units 3-1 through 3-L and transmission antenna weight generator 30, and indicates the beam numbers of beams, with respect to which the path timing is detected, to reception multibeam controller 13.

The timing of the delay times of the respective multipaths is set in delay units 3-1 through 3-L so that it will be used in common by all antennas 1-1 through 1-N. This is because as N antennas 1-1 through 1-N are closely disposed so that the reception signals are correlated to each other, all the delay profiles of respective N antennas 1-1 through 1-N are can be regarded as being equal to each other.

Delay units 3-1 through 3-N delay reception signals received by N antennas 1-1 through 1-N by certain times based on multipath delay times set by searcher 12, thereby delaying the reception signals depending on the L multipaths to differentiate the L multipaths as a first path to an Lth path. The reception signals output from delay units 3-1 through 3-N are despread by despreading circuits 4-1-1 through 4-L-N, and thereafter sent to reception beam formers 5-1 through 5-L.

Reception multibeam controller 13 selects the reception antenna weights of corresponding beams from the beam numbers indicated by searcher 12, sends the selected reception antenna weights to reception beam formers 5-1 through 5-L, and indicates the beam numbers to transmission antenna weight generator 30. Specifically, reception multibeam controller 13 may select the reception antenna weights of corresponding beams from the beam numbers easily by referring to a table, prepared in advance, storing the associative relationship between beams and reception antenna weights.

The above operation of searcher 12 to indicate the timing of the delay times of the multipaths to delay units 3-1 through 3-L of signal processing means 40-1 through 40-L and transmission antenna weight generator 30 and also to indicate the beam numbers to reception multibeam controller 13 to enable them to start signal processing, is referred to as the assignment of fingers.

Reception beam formers 5-1 through 5-L are identical in construction to each other. As shown in FIG. 2, reception beam formers 5-1 through 5-L each comprise multipliers 20-1 through 20-N, adder 21, and complex conjugate circuits 22-1 through 22-N. For the sake of brevity, signal processing means 40-1 will be described by way of example below.

Complex conjugate circuits 22-1 through 22-N of reception beam former 5-1 generate complex conjugates of reception antenna weights selected by reception multibeam controller 13 and sends the generated complex conjugates to multipliers 20-1 through 20-N. Reception signals that have been despread by despreading circuits 4-1-1 through 4-1-N are multiplied by the complex conjugates of reception antenna weights which have been generated by complex conjugate circuits 22-1 through 22-N, by multipliers 20-1 through 20-N. The multiplied reception signals are then added together by adder 21. Therefore, the reception signals are weighted and combined. The output from adder 21 is sent to channel estimating circuit 6-1, signal power measuring unit 8-1, and multiplier 9-1. Thus, reception beam former 5-1 controls the amplitudes and phases of reception signals from antennas 1-1 through 1-N to receive a reception signal with the directivity of a beam that has been formed in a certain direction.

Channel estimating circuit 6-1 estimates a channel distortion using the output from reception beam former 5-1, and sends the estimated channel distortion to complex conjugate circuit 7-1. Complex conjugate circuit 7-1 generates a complex conjugate of the channel distortion estimated by channel estimating circuit 6-1. Multiplier 9-1 multiplies the complex conjugate of the channel distortion which has been generated by complex conjugate circuit 7-1, by the output from reception beam former 5-1, thereby compensating for the channel distortion. The output from multiplier 9-1, which has been compensated for the channel distortion, is added by adder 10 for rake combination, and input to decision unit 11. Decision unit 11 outputs its output as the reception data of the kth user.

Signal power measuring units 8-1 through 8-L measure signal power levels averaged over a desired time, using the signals weighted and combined by reception beam formers 5-1 through 5-L, and sends the measured signal power levels to transmission antenna weight generator 30.

Transmission antenna weight generator 30 generates a transmission antenna weight that forms a transmission beam having an accuracy higher than the resolution of a beam prepared in advance as selected by reception multibeam controller 13, based on the reception signal power level measured by signal power measuring units 8-1 through 8-L, the beam number indicated from reception multibeam controller 13, and the path timing reception information indicated from searcher 12, and sends the generated transmission antenna weight to transmission beam former 16.

Specifically, transmission antenna weight generator 30 detects the maximum reception signal power level of reception signal power levels indicated by signal power measuring units 8-1 through 8-L of signal processing means 40-1 through 40-L, and determines whether the path timing which is the same as the path timing set in a first signal processing means where the maximum reception signal power level is obtained, is present in the path timing set in another signal processing means or not. If the path timing which is the same as the path timing set in the first signal processing means is set in another signal processing means, then transmission antenna weight generator 30 generates a transmission antenna weight based on the reception signal power level of the first signal processing means, the reception signal power level of a second signal processing means in which the path timing that is the same as the path timing set in the first signal processing means is set, and reception antenna weights set in the first and second signal processing means.

Transmission beam former 16 in the present embodiment weights and combines transmission signals, using transmission antenna weights generated by transmission antenna weight generator 30.

As shown in FIG. 3, transmission beam former 16 comprises multipliers 23-1 through 23-N and complex conjugate circuits 24-1 through 24-N. Complex conjugate circuits 24-1 through 24-N of transmission beam former 16 generate complex conjugates of transmission antenna weights generated by transmission antenna weight generator 30 and sends the generated complex conjugates to multipliers 23-1 through 23-N. The transmission data of the kth user is multiplied by the complex conjugates of transmission antenna weights which have been generated by complex conjugate circuits 24-1 through 24-N, by multipliers 23-1 through 23-N. The multiplied transmission data is then transmitted through duplexers 2-1 through 2-N from antennas 1-1 through 1-N.

Operation of the multibeam transmitting/receiving apparatus according to the present embodiment will be described in detail below with reference to the drawings. Particularly, transmission antenna weight generator 30 shown in FIG. 6 will be described in detail below. In a macrocell environment of land mobile communications, it is general that a radio wave transmitted from a mobile station is reflected, diffracted, and scattered by landscapes and features such as buildings and houses around the mobile station, and arrives at a base station as paths having substantially the same arrival angles. Therefore, when a transmission beam is formed based on an uplink reception signal, no problem often arises even if a transmission antenna weight is used for forming a transmission beam in the direction of a path having a maximum reception signal power level.

Figure 7:
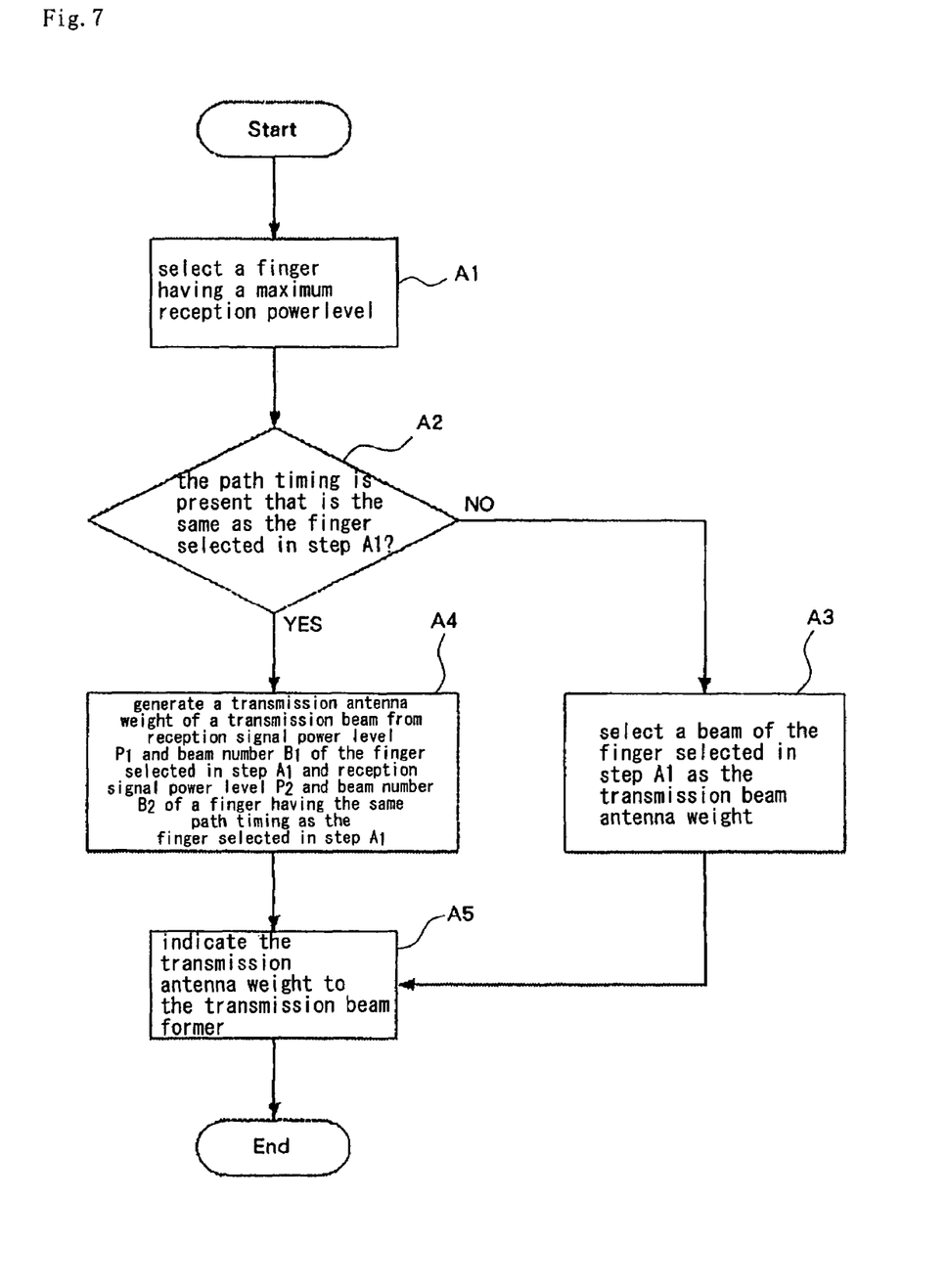
FIG. 7 is a flowchart of an operation sequence of transmission antenna weight generator 30 shown in FIG. 6.

FIG. 7 is a flowchart of an operation sequence of transmission antenna weight generator 30 according to the present embodiment. As shown in FIG. 7, transmission antenna weight generator 30 selects a finger (signal processing means) with respect to which a maximum reception power level has been obtained (step A1). Then, transmission antenna weight generator 30 determines whether the path timing which is the same as the finger selected in step A1, with respect to which the maximum reception power level has been obtained, is present in the path timing set in another finger or not (step A2). If the path timing which is the same as the finger having the maximum reception power level selected in step A1 is not present in the path timing set in another finger, then transmission antenna weight generator 30 judges that the path with respect to which the maximum reception power level has been obtained is coming from near the peak direction of the beam, and selects the transmission antenna weight of the transmission beam corresponding to the beam number of the finger selected in step A1 with respect to which the maximum reception power level has been obtained (step A3). As with reception multibeam controller 13, transmission antenna weight generator 30 may select the transmission antenna weights of corresponding beams from the beam numbers by referring to a table, prepared in advance, storing the associative relationship between beams and transmission antenna weights. If the path timing which is the same as the finger having the maximum reception power level selected in step A1 is present in the path timing set in another finger, then transmission antenna weight generator 30 judges that the path with respect to which the maximum reception power level has been obtained is coming from near the direction of a point of intersection between beams and the finger of the same path is assigned to adjacent beams. Then, transmission antenna weight generator 30 generates a transmission antenna weight of a transmission beam from reception signal power level $P_1$ and beam number $B_1$ of the finger selected in step A1 with respect to which the maximum reception power level has been obtained and reception signal power level $P_2$ and beam number $B_2$ of a finger having the same path timing as the finger selected in step A1 (step A4). The transmission antenna weight selected in step A3 or generated in step A4 is sent from transmission antenna weight generator 30 to transmission beam former 16 (step A5).

The process of generating a transmission antenna weight in step A4 shown in FIG. 7 will be described in detail below. If it is assumed that the reception signal power level of the finger selected in step A1 which has the maximum reception power level is represented by $P_1$, the transmission antenna weight of the beam corresponding to beam number $B_1$ by $W_1(n)(n=1$ through $N)$, the reception signal power level of the finger in the same path timing as the finger selected in step A1 by $P_2$, and the transmission antenna weight of the beam corresponding to beam number $B_2$ by $W_2(n)$, then transmission antenna weight $W(n)$ in step A4 is calculated by the following equation:

$$W(n) = \frac{\sqrt{P_1}\, W_1(n) + \sqrt{P_2}\, W_2(n)}{\sqrt{P_1} + \sqrt{P_2}} \qquad (1)$$

If calculated transmission antenna weight $W(n)$ is used as it is, then the value thereof is too large. Therefore, transmission antenna weight generator 30 normalizes transmission antenna weight $W(n)$ weighted by the reception signal level as indicated by the above equation (1), as indicated by the equation shown below, to calculate transmission antenna weight $W_{TX}(n)$, and sends calculated transmission antenna weight $W_{TX}(n)$ to transmission beam former 16.

$$W_{TX}(n) = \frac{1}{N} \frac{W(n)}{\|W(n)\|} \qquad (2)$$

Figure 8:
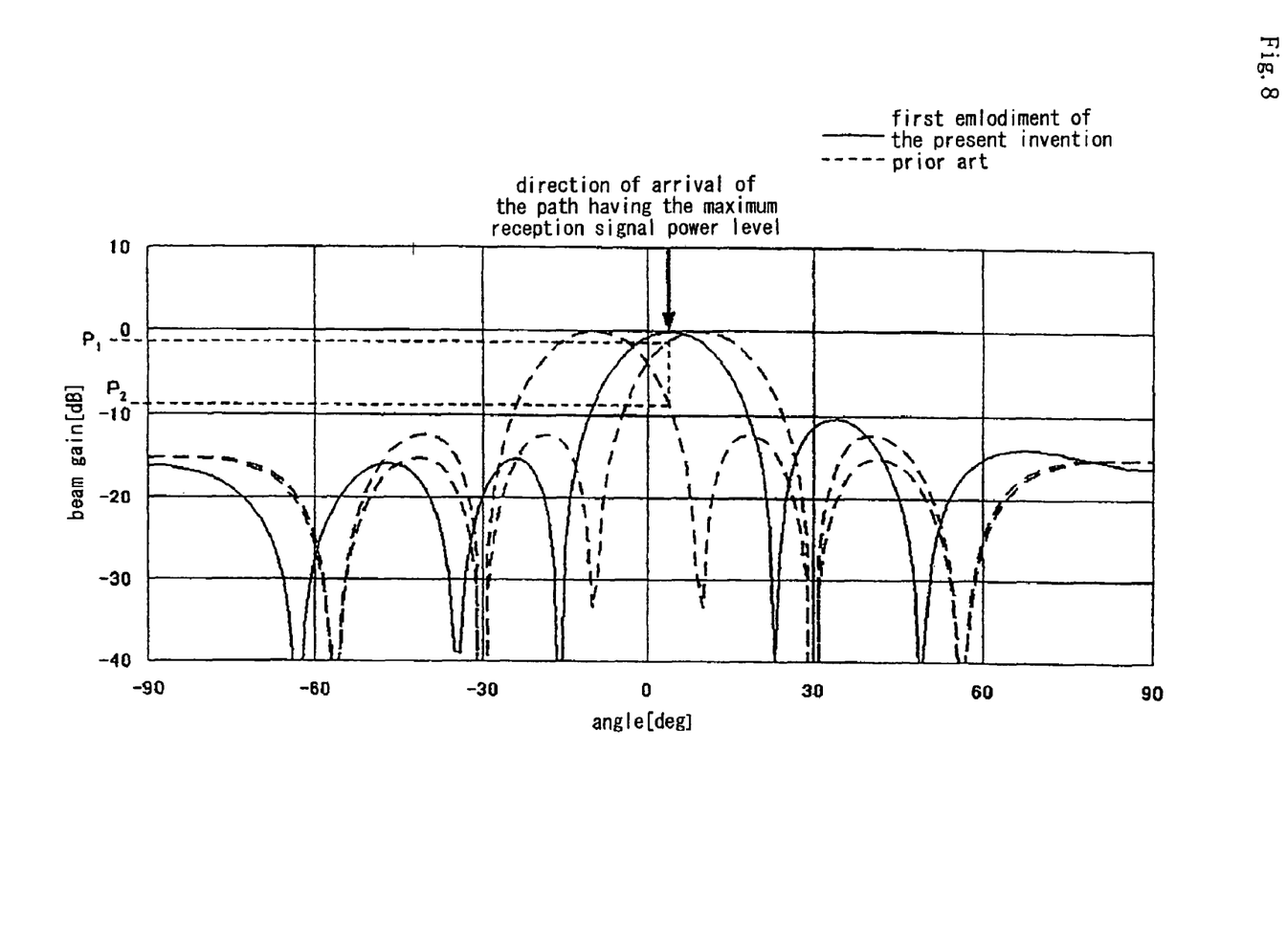
FIG. 8 is a diagram showing by way of example transmission beam patterns of the first embodiment of the present invention and the conventional multi-beam transmitting/receiving apparatus.

FIG. 8 shows by way of example transmission beam patterns formed by transmission beam former 16 when orthogonal multibeams are employed in a linear array of antennas in the present embodiment and the conventional multibeam transmitting/receiving apparatus. The horizontal axis represents angles in the given spatial area and the vertical axis beam gains.

In FIG. 8, the reception signal power level of the finger selected in step A1 which has the maximum reception signal power level is indicated by $P_1$, and the reception signal power level of the finger in the same path timing as the finger selected in step A1 by $P_2$. The solid-line curve represents the transmission beam pattern formed by the multibeam transmitting/receiving apparatus according to the present embodiment, and a broken-line curve the transmission beam pattern formed by the conventional multibeam transmitting/receiving apparatus. As a reference, the beam pattern of the finger in the same path timing as the finger selected in step A1 is also indicated by a broken-line curve.

As shown in FIG. 8, it can be seen that the conventional transmission beam pattern forms a transmission beam displaced off the direction of arrival of the path having the maximum reception signal power level, whereas the transmission beam pattern formed by the multibeam transmitting/ receiving apparatus according to the present embodiment forms a highly accurate transmission beam.

The process of generating a transmission antenna weight in step A4 shown in FIG. 7 may be differently performed as follows: If it is assumed that the reception signal power level of the finger selected in step A1 which has the maximum reception signal power level is indicated by $P_1$, the angle of direction of the beam corresponding to beam number $B_1$ by $\theta_1$, the reception signal power level of the finger in the same path timing as the finger selected in step A1 by $P_2$, and the angle of direction of the beam corresponding to beam number $B_2$ by $\theta_2$, then angle $\theta_{TX}$ of direction of the transmission beam is calculated by the following equation:

$$\theta_{TX} = \frac{\sqrt{P_1}\,\theta_1 + \sqrt{P_2}\,\theta_2}{\sqrt{P_1} + \sqrt{P_2}} \quad (3)$$

Figure 9:
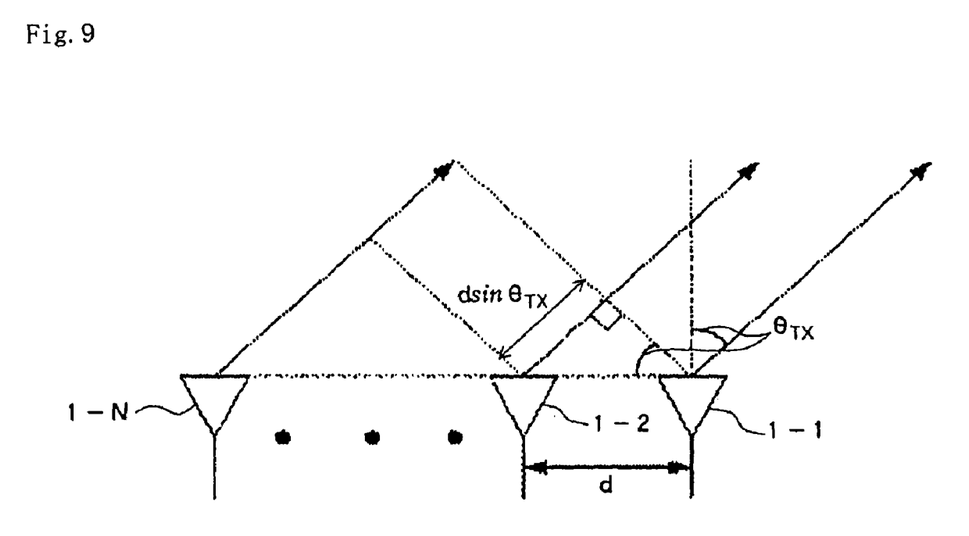
FIG. 9 is a diagram showing how signals are transmitted from antennas.

FIG. 9 shows, by way of example, how signals are transmitted from a linear array of antennas 1-1 through 1-N. The signals that are transmitted from a linear array of antennas 1-1 through 1-N are caused to lead in phase at a mobile station, depending on the direction of arrival of the signals. Specifically, the signal that is transmitted from first antenna 1-1 and received by the mobile station leads the signal transmitted from nth antenna 1-n in phase by $(n-1)(2\pi d/\lambda)\sin\theta_{TX}$ where d represents the distance between adjacent ones of antennas 1-1 through 1-N, and $\lambda$ the wavelength of the carrier frequency. In order for the mobile station to receive the signals in phase, in view of the fact that complex conjugate circuits 24-1 through 24-N of transmission beam former 16 generate complex conjugates of transmission antenna weights, it is necessary to calculate transmission antenna weight $W_{TX}(n)$ normalized by the following equation:

$$W_{TX} = \frac{1}{N}\cos\left(n\frac{2\pi}{\lambda}d\sin\theta_{TX}\right) - j\frac{1}{N}\sin\left(n\frac{2\pi}{\lambda}d\sin\theta_{TX}\right) \quad (4)$$

The angle of the beam direction of a corresponding beam may be selected from a beam number by referring to a table, prepared in advance, storing the associative relationship between beams and beam direction angles.

With the multibeam transmitting/receiving apparatus according to the present embodiment, searcher 12 generates delay profiles for respective preset beams, and if the same path timing as the path timing with respect to which the maximum reception power level has been detected is detected from different delay profiles, then transmission antenna weight generator 30 judges that the mobile station to which data is to be transmitted is present in a position displaced off the peak direction of any beams. When transmission antenna weight generator 30 makes such a judgement, transmission antenna weight generator 30 calculates a transmission antenna weight based on reception antenna weights with respect to two beams from which the path timing has been detected and reception power levels obtained using two path timings.

With the multibeam transmitting/receiving apparatus according to the present embodiment, therefore, it is possible to form a highly accurate transmission beam from the resolution of reception antenna weights of beams, prepared in advance, selected by reception multibeam controller 13, and to generate a transmission antenna weight for transmission in the direction of a desired user, with utmost ease. Consequently, even if the desired user is present in any positions, data can optimally be transmitted to the desired user, and interference with other users, which has heretofore been problematic as it occurs if the peak direction of a beam is not optimum, is reduced.

2nd EMBODIMENT

Figure 10:
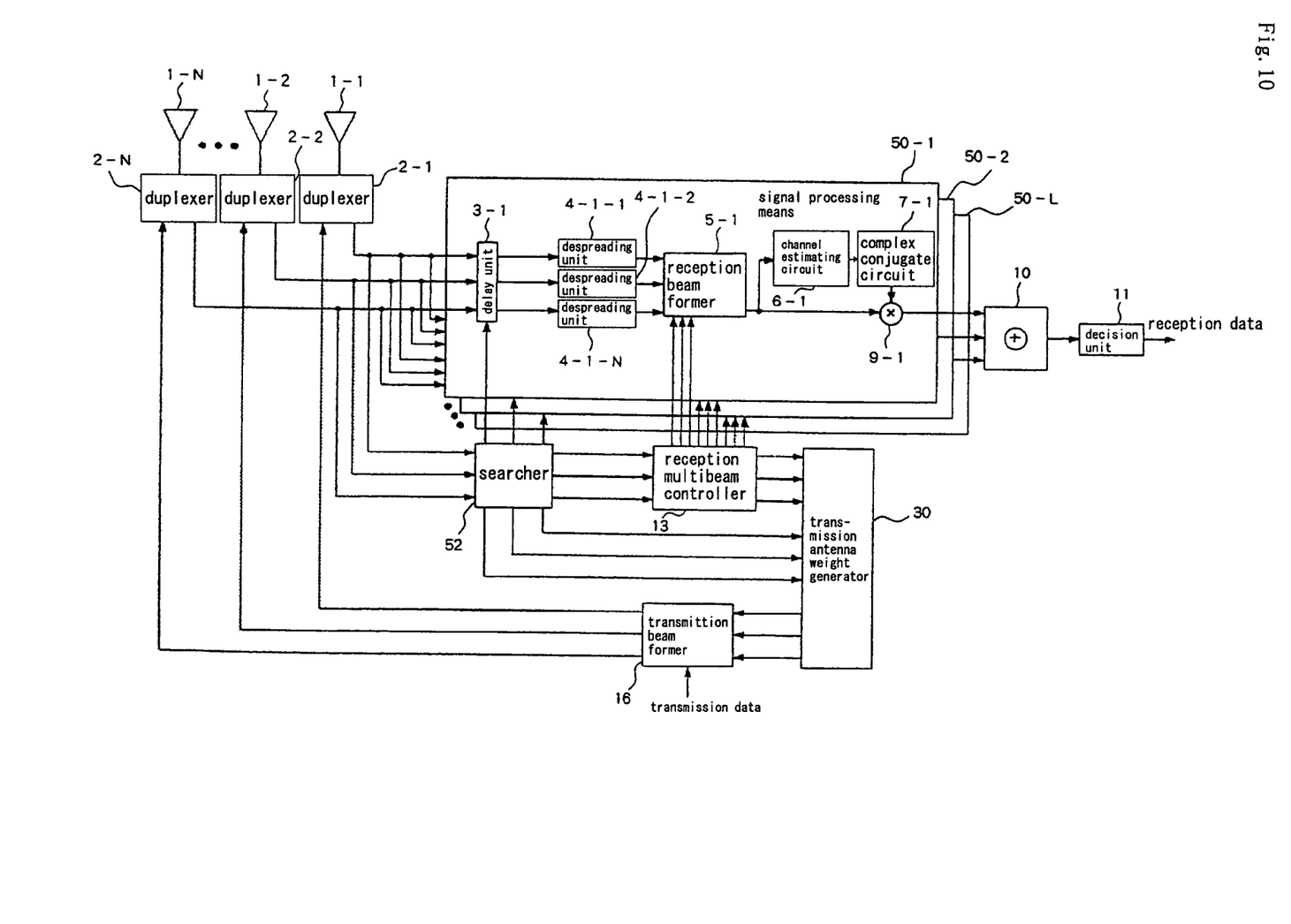
FIG. 10 is a block diagram of an arrangement of a multi-beam transmitting/receiving apparatus according to a second embodiment of the present invention.

A second embodiment of the present invention will be described in detail below with reference to the drawings. FIG. 10 is a diagram showing an arrangement of a multi-beam transmitting/receiving apparatus according to the second embodiment of the present invention. Those parts of the multi-beam transmitting/receiving apparatus which are identical to those shown in FIG. 6 are denoted by identical reference characters. The second embodiment is similar to the first embodiment. According to the first embodiment, for forming a transmission antenna weight, signal power measuring units 8-1 through 8-L of signal processing means 40-1 through 40-L utilizes a reception signal power level averaged over a desired time, using the outputs from reception beam formers 5-1 through 5-L. According to the second embodiment, a reception signal power level at the time the delay times of respective multipaths are detected from the delay profiles of respective beams which are generated by searcher 52 is utilized.

The multi-beam transmitting/receiving apparatus according to the present embodiment differs from the multi-beam transmitting/receiving apparatus according to the first embodiment in that searcher 12 is replaced with searcher 52, and signal processing means 40-1 through 40-L with signal processing means 50-1 through 50-L.

As shown in FIG. 10, signal processing means 50-1 through 50-L of the multi-beam transmitting/receiving apparatus according to the present embodiment comprise delay units 3-1 through 3-L, despreading circuits 4-1-1 through 4-L-N, reception beam formers 5-1 through 5-L, channel estimating circuits 6-1 through 6-L, complex conjugate circuits 7-1 through 7-L, and multipliers 9-1 through 9-L. Operation of the multi-beam transmitting/receiving apparatus according to the present embodiment is the same as that of the first embodiment except that it is devoid of signal power measuring units 8-1 through 8-L shown in FIG. 6, and will not be described below.

Searcher 52 according to the present embodiment indicates not only the timing of the delay times of respective multipaths, but also the reception signal power levels of respective fingers which are obtained when respective path timings are detected, to transmission antenna weight generator 30. Other operation of antennas 1-1 through 1-N, duplexers 2-1 through 2-N, adder 10, decision unit 11, reception multibeam controller 13, transmission antenna weight generator 30, and transmission beam former 16 is the same as those of the first embodiment, and will not be described below.

According to the present embodiment, signal processing means 50-1 through 50-L do not require a function to measure a reception signal power level. Therefore, the present embodiment offers a new advantage in that the amount of calculations performed by signal processing means 50-1 through 50-L is reduced.

According to the present invention, it is possible to form a highly accurate transmission beam from the resolution of reception antenna weights of beams, prepared in advance, selected by reception multibeam controller 13, and to generate a transmission antenna weight for transmission in the direction of a desired user, with utmost ease. Consequently, even if the desired user is present in any positions, data can optimally be transmitted to the desired user, and interference with other users, which has heretofore been problematic as it occurs if the peak direction of a beam is not optimum, is reduced.

In the first embodiment and second embodiment described above, the beam numbers used by transmission antenna weight generator 30 are indicated by searcher 12 through reception multibeam controller 13. However, beam numbers at the time the delay times of respective multipaths are detected from the delay profiles of respective beams which are generated by searcher 12 may be directly indicated to transmission antenna weight generator 30.

In the first embodiment and second embodiment described above, furthermore, the beam layout of either one of an orthogonal multibeam pattern and an equally spaced multibeam pattern may be employed as the beam layout of a multibeam pattern.

In the first embodiment and second embodiment described above, moreover, CDMA has basically been described. However, since TDMA (Time Division Multiple Access) or FDMA (Frequency Division Multiple Access) is capable of separating a plurality of arriving waves, the present invention is applicable to multibeam transmitting/receiving apparatus of the types other than CDMA.

The invention claimed is:

1. A multibeam transmitting/receiving apparatus for receiving uplink reception signals using a plurality of antennas and controlling the directivities of downlink transmission signals transmitted from the antennas based on the strength of the reception signals, wherein delay profiles for respective preset beams are generated, and if different delay profiles having the same path timing as the path timing of a delay profile with respect to which a maximum reception power level has been detected, then the directivities of the downlink transmission signals are determined based on reception antenna weights used for beams corresponding to two delay profiles from which the path timing has been detected and reception power levels obtained correspondingly to said path timings, said directivity being determined by the transmission antenna weight W(n), determined by the formula:

$$W(n) = \frac{\sqrt{P_1}\, W_1(n) + \sqrt{P_2}\, W_2(n)}{\sqrt{P_1} + \sqrt{P_2}}$$

wherein $P_1$ is the maximum reception power level, $W_1(n)$ is the transmission antenna weight of the first beam having said maximum power level, and $W_2(n)$ is the transmission antenna weight of the second beam having the same path timing as the first beam, where W1(n) and W2(n) may be selected from a table storing the associative relationship between beams and transmission antenna weights.

2. A multibeam transmitting/receiving method of receiving uplink reception signals using a plurality of antennas and controlling the directivities of downlink transmission signals transmitted from the antennas based on the strength of the reception signals, said method comprising the steps of: generating delay profiles and path timings for respective preset beams; performing signal reception processing based on the path timings for respective delay profiles; detecting different delay profiles having the same path timing as the path timing of a delay profile with respect to which a maximum reception power level has been detected in the signal reception processing performed; if different delay profiles are detected that have the same path timing as the path timing of a delay profile with respect to which the maximum reception power level has been detected, determining the directivities of downlink transmission signals based on reception antenna weights used for the beams corresponding to two delay profiles from which the pat timing has been detected and reception power levels obtained correspondingly to said path timings, said directivity being determined by the transmission antenna weight W(n), determined by the formula:

$$W(n) = \frac{\sqrt{P_1}\, W_1(n) + \sqrt{P_2}\, W_2(n)}{\sqrt{P_1} + \sqrt{P_2}}$$

wherein $P_1$ is the maximum reception power level, $W_1(n)$ is the transmission antenna weight of the first beam having said maximum power level, and $W_2(n)$ is the transmission antenna weight of the second beam having the same path timing as the first beam, where $W_1(n)$ and $W_2(n)$ may be selected from a table storing the associative relationship between beams and transmission antenna weights.

* * * * *